US009300918B2

(12) United States Patent
Kang et al.

(10) Patent No.: US 9,300,918 B2
(45) Date of Patent: Mar. 29, 2016

(54) SERVICE ACCESS CONTROL SYSTEM AND METHOD USING EMBEDDED BROWSER AGENT

(75) Inventors: Chun-Un Kang, Seoul (KR); Chang-Nam Chu, Yongin-si (KR); Ki-Won Kwak, Seongnam-si (KR); Min-Woo Jung, Seoul (KR); Dae-Hyun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 297 days.

(21) Appl. No.: 12/345,814

(22) Filed: Dec. 30, 2008

(65) Prior Publication Data

US 2009/0182850 A1 Jul. 16, 2009

(30) Foreign Application Priority Data

Jan. 14, 2008 (KR) ........................ 10-2008-0004026

(51) Int. Cl.

| | |
|---|---|
| ***H04N 21/426*** | (2011.01) |
| ***H04L 29/08*** | (2006.01) |
| ***H04N 7/173*** | (2011.01) |
| ***H04N 21/258*** | (2011.01) |
| ***H04N 21/4782*** | (2011.01) |
| ***H04N 21/643*** | (2011.01) |

(52) U.S. Cl.

CPC ............ *H04N 7/17318* (2013.01); *H04L 67/02* (2013.01); *H04N 21/25816* (2013.01); *H04N 21/42684* (2013.01); *H04N 21/4782* (2013.01); *H04N 21/64322* (2013.01)

(58) Field of Classification Search

None

See application file for complete search history.

(56) References Cited

U.S. PATENT DOCUMENTS

| | | | | |
|---|---|---|---|---|
| 6,546,002 | B1 * | 4/2003 | Kim | 370/351 |
| 7,275,086 | B1 | 9/2007 | Bodnar | |
| 7,454,233 | B2 | 11/2008 | Lu et al. | |
| 7,509,496 | B2 * | 3/2009 | Skog et al. | 726/7 |
| 7,644,145 | B2 * | 1/2010 | Rockwell | 709/223 |
| 7,925,245 | B1 * | 4/2011 | Soelberg et al. | 717/176 |
| 8,086,253 | B1 * | 12/2011 | Kalamkar et al. | 709/217 |
| 8,135,860 | B1 * | 3/2012 | Brown et al. | 709/246 |
| 8,156,549 | B2 * | 4/2012 | Rice et al. | 726/9 |
| 8,254,543 | B2 | 8/2012 | Sasaki et al. | |
| 2002/0038349 | A1 * | 3/2002 | Perla et al. | 709/217 |

(Continued)

FOREIGN PATENT DOCUMENTS

| | | | |
|---|---|---|---|
| CN | 101027929 | A | 8/2007 |
| CN | 101043368 | A | 9/2007 |

(Continued)

OTHER PUBLICATIONS

Robinson, Peter, "Understanding Digital Certificates and Secure Sockets Layer (SSL)", Jan. 2001, Entrust, pp. 1-6.*

(Continued)

*Primary Examiner* — Patrice Winder

(74) *Attorney, Agent, or Firm* — Sughrue Mion, PLLC

(57) ABSTRACT

Provided is a service access control system using an embedded browser agent. The service access control system includes: a server providing an Internet protocol service; and a browser agent including device information and service information and controlling the access of a device to the server. When the service access control system is used, device dependence can be minimized in an embedded browser-based IPTV service, and the IPTV service can be freely used by utilizing only a browser.

18 Claims, 5 Drawing Sheets

10 SERVER
INTERNET
20
21 BROWSER AGENT
23 CLIENT INFORMATION MANAGING UNIT
24 VERIFICATION ACCESS CONTROL UNIT
25 DEVICE UPDATE MANAGING UNIT
26 SERVICE MANAGING UNIT
27 USER HISTORY MANAGING UNIT

(56) References Cited

U.S. PATENT DOCUMENTS

| | | | | |
|---|---|---|---|---|
| 2003/0115275 | A1* | 6/2003 | Toga | 709/206 |
| 2006/0005026 | A1* | 1/2006 | Song et al. | 713/173 |
| 2006/0059462 | A1 | 3/2006 | Yamamoto | |
| 2006/0069714 | A1* | 3/2006 | Blount et al. | 709/203 |
| 2006/0079284 | A1 | 4/2006 | Lu et al. | |
| 2006/0258341 | A1* | 11/2006 | Miller et al. | 455/414.1 |
| 2007/0174300 | A1* | 7/2007 | Kim | 707/10 |
| 2007/0266310 | A1 | 11/2007 | Sasaki et al. | |
| 2008/0139112 | A1* | 6/2008 | Sampath et al. | 455/3.04 |
| 2008/0172706 | A1* | 7/2008 | Robinson et al. | 725/109 |
| 2008/0189360 | A1* | 8/2008 | Kiley et al. | 709/203 |

FOREIGN PATENT DOCUMENTS

| | | | |
|---|---|---|---|
| EP | 1026608 | A2 | 1/2000 |
| EP | 1 792 508 | | 3/2006 |
| JP | 2002044547 | A | 2/2002 |
| JP | 2004030631 | A | 1/2004 |
| JP | 2006508622 | A | 3/2006 |
| JP | 2006-129356 | A | 5/2006 |
| JP | 2006-301992 | A | 11/2006 |
| JP | 2007249697 | A | 9/2007 |
| JP | 2007293695 | A | 11/2007 |
| KR | 1020040035182 | A | 4/2004 |
| WO | 00/55728 | A1 | 9/2000 |
| WO | 2004068367 | A3 | 8/2004 |

OTHER PUBLICATIONS

Communication dated Feb. 5, 2013 issued by the Japanese Patent Office in counterpart Japanese Application No. 2010-542178.

Communication dated Sep. 11, 2012, issued by the Patent Office of the People's Republic of China in counterpart Chinese Application No. 200980102191.X.

Communication, dated Apr. 27, 2013, issued by the State Intellectual Property Office in counterpart Chinese Application No. 200980102191.X.

Communication dated Jul. 25, 2014 issued by the Korean Intellectual Property Office in counterpart Korean Patent Application No. 10-2008-0004026.

Communication dated Jun. 1, 2015, issued by the Japanese Patent Office in counterpart Japanese Application No. 2014-157456.

* cited by examiner

FIG. 4

```
--------: +0 +1 +2 +3 +4 +5 +6 +7 +8 +9 +A +B +C +D +E +F   -----------
       0: 47 45 54 20 2F 20 48 54 54 50 2F 31 2E 31 0D 0A   GET / HTTP/1.1..
      10: 41 63 63 65 70 74 3A 20 69 6D 61 67 65 2F 67 69   accept: image/gi
      20: 66 2C 20 69 6D 61 67 65 2F 78 2D 78 62 69 74 6D   f, image/x-xbitm
      30: 61 70 2C 20 69 6D 61 67 65 2F 6A 70 65 67 2C 20   ap, image/jpeg,
      40: 69 6D 61 67 65 2F 70 6A 70 65 67 2C 20 61 70 70   image/pjpeg, app
      50: 6C 69 63 61 74 69 6F 6E 2F 78 2D 73 68 6F 63 6B   lication/x-shock
      60: 77 61 76 65 2D 66 6C 61 73 68 2C 20 61 70 70 6C   wave-f lash, appl
      70: 69 63 61 74 69 6F 6E 2F 76 6E 64 2E 6D 73 2D 65   ication/vnd.ms-e
      80: 78 63 65 6C 2C 20 61 70 70 6C 69 63 61 74 69 6F   xcel, applicatio
      90: 6E 2F 76 6E 64 2E 6D 73 2D 70 6F 77 65 72 70 6F   n/vnd.ms-powerpo
      a0: 69 6E 74 2C 20 61 70 70 6C 69 63 61 74 69 6F 6E   int, application
      b0: 2F 6D 73 77 6F 72 64 2C 20 61 70 70 6C 69 63 61   /msword, applica
      c0: 74 69 6F 6E 2F 78 2D 73 69 6C 76 65 72 6C 69 67   tion/x-silverlig
      d0: 68 74 2C 20 2A 2F 2A 0D 0A 41 63 63 65 70 74 2D   ht, */*..Accept-
      e0: 4C 61 6E 67 75 61 67 65 3A 20 6B 6F 0D 0A 55 41   Language: ko..UA
      f0: 2D 43 50 55 3A 20 78 38 36 0D 0A 41 63 63 65 70   -CPU:x86..Accep
     100: 74 2D 45 6E 63 6F 64 69 6E 67 3A 20 67 7A 69 70   t-Encoding: g. ip
     110: 2C 20 64 65 66 6C 61 74 65 0D 0A 55 73 65 72 2D   , deflate..User-
     120: 41 67 65 6E 74 3A 20 4D 6F 7A 69 6C 6C 61 2F 34   Agent: Mo.llla/4
     130: 2E 30 20 28 63 6F 6D 70 61 74 69 62 6C 65 3B 20   .0 (compatible;
     140: 4D 53 49 45 20 37 2E 30 3B 20 57 69 6E 64 6F 77   MSIE 7.0; Window
     150: 73 20 4E 54 20 35 2E 31 3B 20 49 6E 66 6F 50 61   s Nt 5.1; Infopa
     160: 74 68 2E 32 3B 20 2E 4E 45 54 20 43 4C 52 20 32   th.2; .NET CLR 2
     170: 2E 30 2E 35 30 37 32 37 29 0D 0A 48 6F 73 74 3A   .0.50727)..Host:
     180: 20 31 32 37 2E 30 2E 30 2E 31 3A 35 35 34 0D 0A   127.0.0.1:554..
     190: 43 6F 6E 6E 65 63 74 69 6F 6E 3A 20 4B 65 65 70   Connection:Aeep
     1a0: 2D 41 6C 69 76 65 0D 0A 0D 0A                     -Alive....
```

A

SERVICE ACCESS CONTROL SYSTEM AND METHOD USING EMBEDDED BROWSER AGENT

CROSS REFERENCE TO RELATED APPLICATION

This application claims priority from Korean Patent Application No. 10-2008-0004026 filed on Jan. 14, 2008 in the Korean Intellectual Property Office, the disclosure of which is incorporated herein by reference in its entirety.

BACKGROUND OF THE INVENTION

1. Field of the Invention

Systems and methods consistent with the present invention relate to Internet protocol television (IPTV), and more particularly, to a service access control system and method using an embedded browser agent, in which device dependence can be minimized in an embedded browser-based IPTV service, and the IPTV service can be freely used by utilizing only a browser.

2. Description of the Related Art

While only terrestrial broadcasts were available in the past, various broadcasts, such as cable broadcasts and satellite broadcasts, are available now. In particular, the recent introduction of IPTV has brought about an era in which various contents combined with web services can be offered.

For an IPTV portal service, a web browser is ported to a device. That is, the web browser is used to provide various contents, upgrade services associated with the device, and verify the device and a user.

FIG. 1 is a block diagram of a related art service access control system using an embedded browser. FIG. 2 is a flowchart illustrating a related art service access control method using an embedded browser.

Referring to FIGS. 1 and 2, the related art service access control system includes a custom device plug-in 3 which interfaces with a custom browser 5 in order to transmit device-dependent information to an IPTV portal server 9 via the Internet. That is, the custom device plug-in 3 is used to transmit device environment information, such as device serial number and device firmware information, to the custom browser 5.

According to the related art service access control method, device metadata including an environment variable is generated using a device application program interface (API) 1. Then, a shell 7 accesses a portal service of the IPTV portal server 9 via custom browser 5 using the generated device metadata including the environment variable. If the device metadata is needed while the portal service is being used, the device metadata is retrieved using the custom device plug-in 3 of a device-embedded web browser, and the retrieved device metadata is processed, as shown in the portal service routine of FIG. 2. The processed device metadata is transmitted to the IPTV portal server 9, which, in turn, verifies the processed device metadata.

In this case, however, when the portal service is associated with various devices, a different interface must be configured according to properties of each device.

In addition, since a different browser is used for each device, an interface for each browser must be created. Thus, it is difficult to use a standardized web browser.

Also, when a web browser is embedded into each device according to properties of the device, a plug-in must be developed.

SUMMARY OF THE INVENTION

The present invention provides a service access control system and method, in which device dependence can be minimized in an embedded browser-based IPTV service, and the IPTV service can be freely used by utilizing only a browser.

However, the aspects of the present invention are not restricted to those set forth herein. The above and other aspects of the present invention will become more apparent to one of daily skill in the art to which the present invention pertains by referencing a detailed description of the present invention given below.

According to an aspect of the present invention, there is provided a service access control system using an embedded browser agent. The system includes: a server providing an Internet protocol service; and a browser agent including device information and service information and controlling the access of a device to the server.

According to another aspect of the present invention, there is provided a service access control method using an embedded browser agent. The method includes: (a) adding device information and service information to a browser agent; and (b) accessing a server, which provides an Internet protocol service, using the browser agent.

BRIEF DESCRIPTION OF THE DRAWINGS

The above and other aspects and features of the present invention will become more apparent by describing in detail exemplary embodiments thereof with reference to the attached drawings, in which:

FIG. 4 illustrates an example of client information included in a browser agent in the form of character strings.

DETAILED DESCRIPTION OF EXEMPLARY EMBODIMENTS OF THE INVENTION

Figure 1:
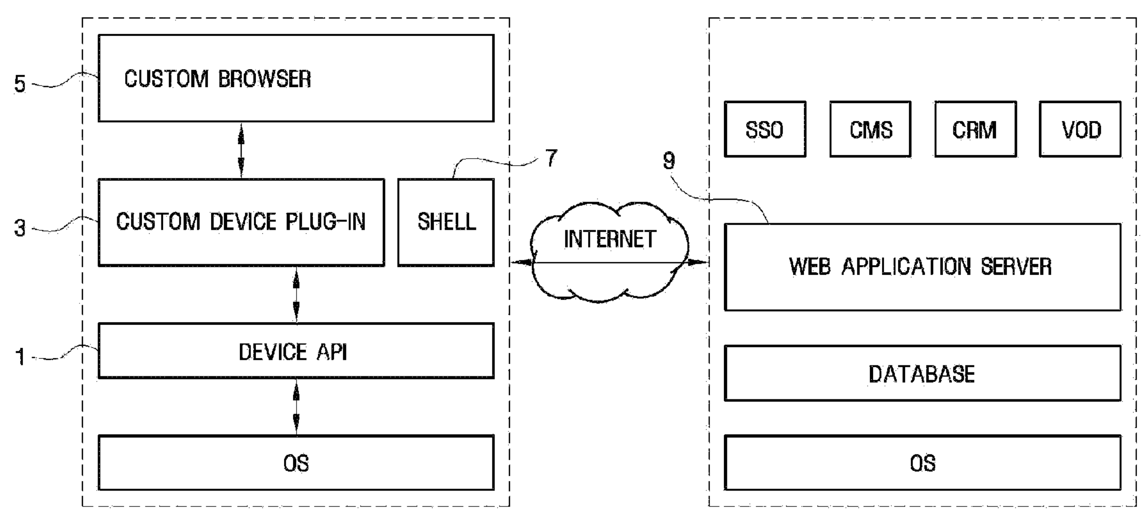
FIG. 1 is a block diagram of a related art service access control system using an embedded browser.
Figure 2:
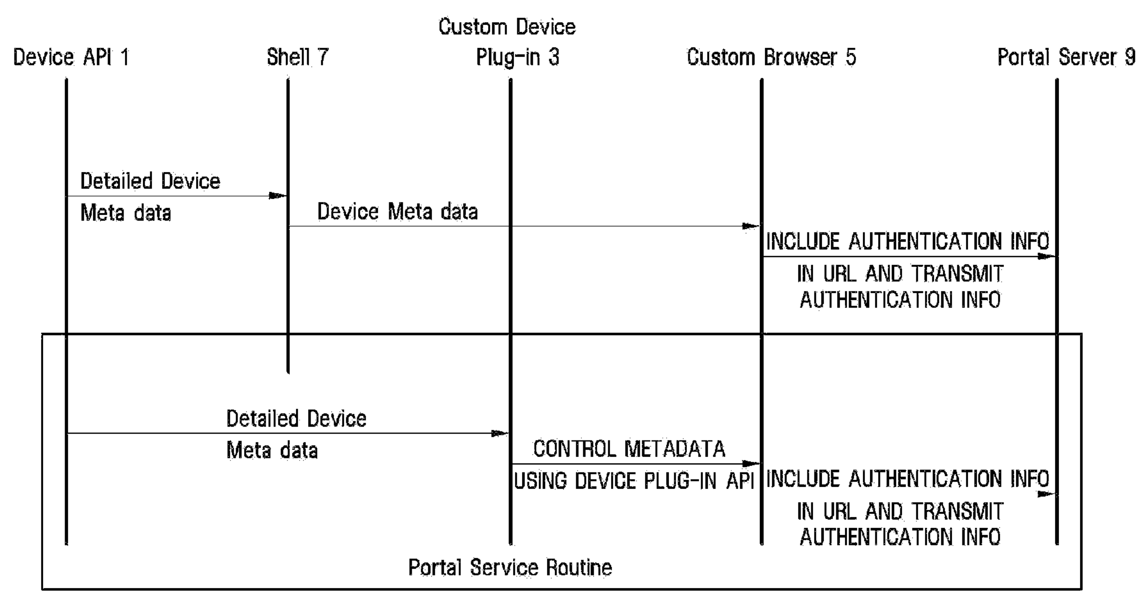
FIG. 2 is a flowchart illustrating a related art service access control method using an embedded browser.

Features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, a service access control system and method using an embedded browser agent according to exemplary embodiments of the present invention will be described in detail with reference to the attached drawings. A detailed description might be omitted when it is determined that related art or the detailed description of the structure may unnecessarily obscure the aspects of the present invention.

Figure 3:
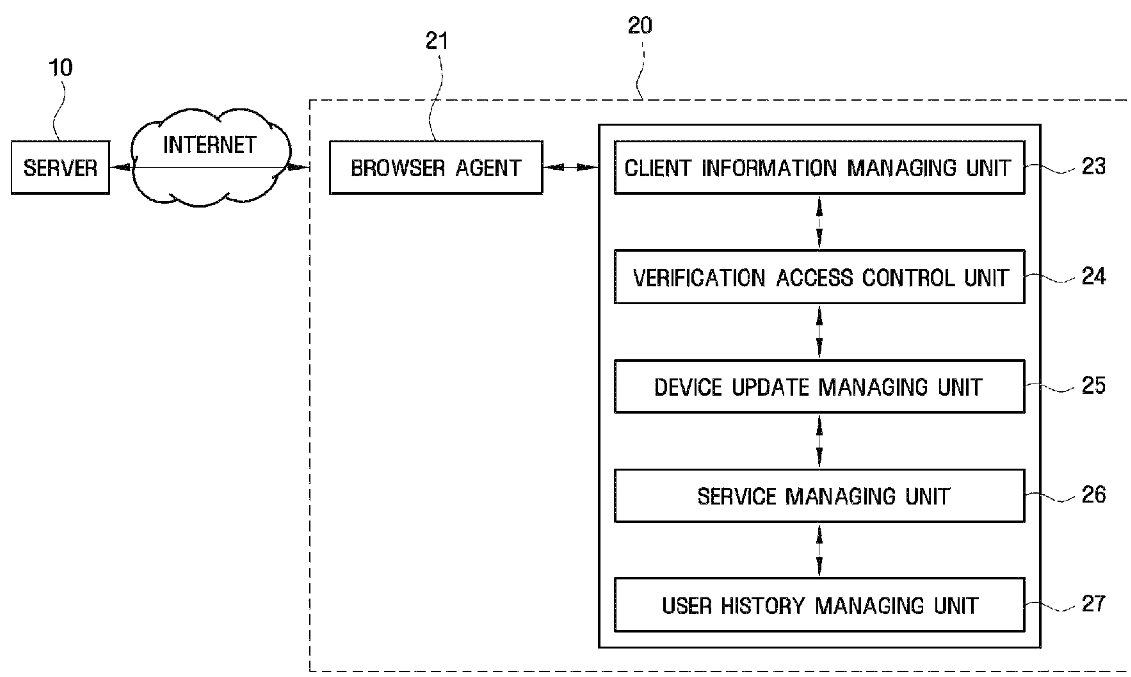
FIG. 3 is a block diagram of a service access control system using an embedded browser agent according to an exemplary embodiment of the present invention.

FIG. 3 is a block diagram of a service access control system using an embedded browser agent 21 according to an exemplary embodiment of the present invention. FIG. 4 illustrates an example of client information included in the browser agent 21 in the form of character strings.

Referring to FIGS. 3 and 4, the service access control system according to an exemplary embodiment of the present embodiment includes a server 10, the browser agent 21, a client information managing unit 23, a verification access control unit 24, a device update managing unit 25, a service managing unit 26, and a user history managing unit 27.

The server 10 provides IPTV portal services. The browser agent 21 is ported to a device 20 and includes device information and service information. The browser agent 21 controls the connection between the server 10 and the device 20. In this case, the device information may include device model, device version, device serial number, and session key information.

When the device 20 accesses the server 10, the browser agent 21 generates a session key according to a predetermined algorithm and transmits the generated session key to the server 10. Specifically, the browser agent 21 generates a session key only once when the device 20 accesses the server 10 for the first time. Thus, when the device accesses the server 10 again after a browser is terminated, the session key can be regenerated.

The client information managing unit 23 extracts client information from the browser and the device 20 and manages the extracted client information. The client information may include browser information, device model, device version, device serial number, session key information, and other additional information. The client information may be included in the browser agent 21 in the form of character strings (e.g. portion 'A' in FIG. 4) according to the hypertext transfer protocol (HTTP) specification. The form of character strings of the client information may vary from manufacturer to manufacturer.

The verification access control unit 24 verifies the identity of the device 20, which is attempting to access the server 10 through the browser agent 21, to control the access of the device 20 to the server 10. The authentication access control unit 24 verifies the identify of the device 20 only once based on a device serial number included in the browser agent 21. Thus, when the device 20 accesses the server 10 again, the identity verification process may be omitted.

The verification access control unit 24 may provide a personalized service based on a combination of the device serial number and user information.

The device update managing unit 25 updates and manages the device information included in the browser agent 21.

The service managing unit 26 manages services that can be supported by the server 10 on a corresponding device model and in a corresponding software version.

The user history managing unit 27 manages a history of users that have accessed the server 10 through the browser agent 21 and used the services.

Hereinafter, a service access control method using an embedded browser agent according to an exemplary embodiment of the present invention will be described in detail with reference to FIG. 5.

Figure 5:
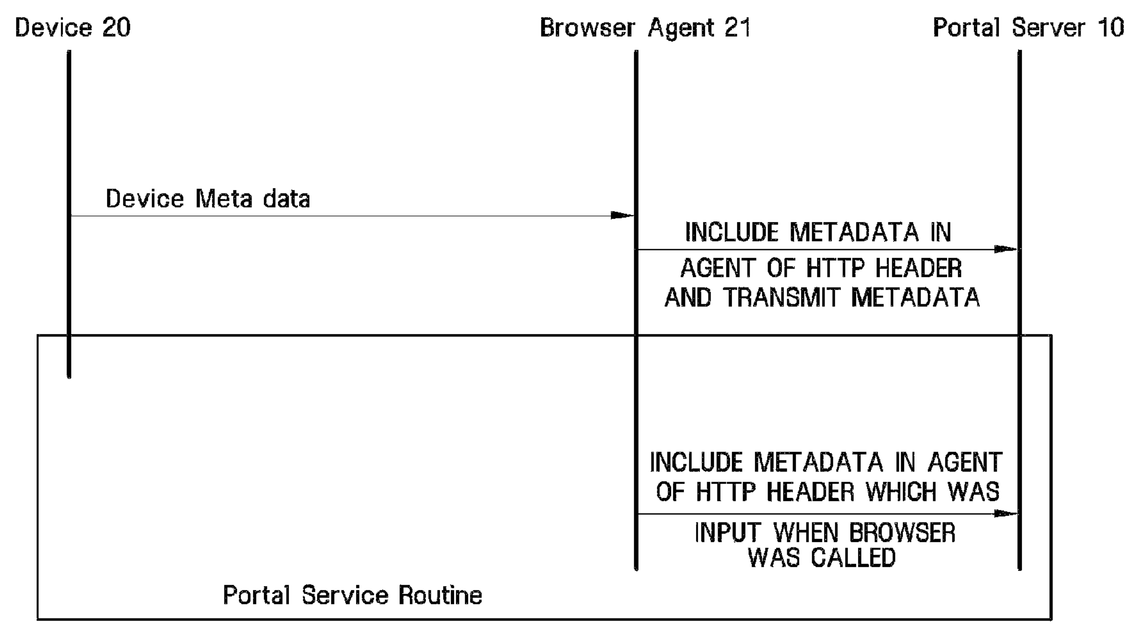
FIG. 5 is a flowchart illustrating a service access control method using an embedded browser agent according to an exemplary embodiment of the present invention.

FIG. 5 is a flowchart illustrating a service access control method using an embedded browser agent according to an exemplary embodiment of the present invention.

As shown in FIG. 5, the present invention is designed to operate using an embedded browser. When the IPTV portal server 10 is accessed using the browser agent 21, device metadata and service metadata may be added to the browser agent 21 to use a service.

Specifically, in the service access control method according to the present exemplary embodiment, metadata including device information and service information are added to the browser agent 21, and the server 10, which provides IPTV portal services, is accessed using the browser agent 21. Here, when the server 10 is accessed for the first time by using the browser agent 21, a session key is generated and transmitted to the server 10. More specifically, a session key is generated only once when the server 10 is accessed for the first time by using the browser agent 21. Therefore, when the server 10 is accessed again after a browser is terminated, the session key is regenerated by the browser agent 21, as shown in the portal service routine of FIG. 5.

The client information managing unit 23 extracts client information from the browser and the device 20 and manages the extracted client information. The client information may be included in the browser agent 21 in the form of character strings according to the HTTP specification and transmitted to the server 10.

The verification access control unit 24 verifies the device information of the device 20, which is attempting to access the server 10 through the browser agent 21, to control the access of the device 20 to the server 10. That is, the verification access control unit 24 verifies the device information of the device 20 by retrieving device model, device version, device serial number, and session key information. In addition, the verification access control unit 24 verifies the identify of the device 20 only once based on a device serial number included in the browser agent 21. Thus, when the device 20 accesses the server 10 again, the identity verification process may be omitted.

The verification access control unit 24 also provides a personalized service based on a combination of the device serial number included in the browser agent 21 and user information.

The device update managing unit 25 updates and manages a device model and a software version included in the browser agent 21. That is, the device update managing unit 25 checks the software version of the device 20 and, if the software version is not the latest version, updates the software version.

The service managing unit 26 manages services that can be supported by the server 10 on a corresponding device model and in a corresponding software version. That is, the service managing unit 26 manages portal services by software version and by individual user in consideration of functions that can be provided on the device 20.

The user history managing unit 27 manages a history of users that have accessed the server 10 through the browser agent 21 and used the services. That is, the user history managing unit 27 records user log-in information to identify how frequently a specified menu of a service has been used.

As described above, in a service access control system and method using an embedded browser agent according to the present invention, implementation simplicity can be achieved since only a browser is used to utilize HTTP without requiring a conventional plug-in. Thus, the time required to develop an IPTV portal service can be reduced, and the cost required for communications between a portal service and a device can be minimized.

Further, since a standardized protocol is used, compatibility and security can be improved.

Additionally, a personalized service can be provided based on a combination of a device serial number included in a browser agent and user information.

However, the aspects of the present invention are not restricted to those set forth herein. The above and other aspects of the present invention will become more apparent to one of ordinary skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A device for accessing an internet protocol server, the device comprising:

a browser agent configured to receive device information and service information, and control a connection between the internet protocol service server and the device based on the device information and the service information, the browser agent being embedded in the device;

a client information management unit configured to extract client information from character strings according to a hypertext transfer protocol (HTTP) specification of the browser agent, and transmit the extracted client information to the server; and a verification access control unit configured to verify an identity of the device once based on a device serial number included in the browser agent when the device attempts to access the server using the browser agent so that the verification access control unit verifying the identity of the device is omitted when the device accesses the server again using the browser agent.

2. The device of claim 1, wherein the device information comprises at least one among a device model, a device version, the device serial number, and session key information.

3. The device of claim 1, wherein the browser agent is further configured to:

generate a session key when the device accesses the server using the browser agent; and transmit the generated session key to the server.

4. The device of claim 3, wherein the browser agent is further configured to:

generate the session key once when the device accesses the server for a first time using the browser agent; and regenerate the session key when the device accesses the server again using the browser agent after a browser is terminated.

5. The device of claim 1, wherein the client information comprises at least one among a browser, a device model, a device version, the device serial number, and session key information.

6. The device of claim 1, wherein the verification access control unit is further configured to:

verify the device information when the device attempts to access the server using the browser agent; and control the access of the device to the server.

7. The device of claim 6, wherein the verification access control unit is further configured to provide a personalized service based on a combination of the device serial number included in the browser agent and user information.

8. The device of claim 1, further comprising a device update managing unit configured to update the device information included in the browser agent.

9. The device of claim 1, further comprising a service managing unit configured to manage services that can be supported by the server in a corresponding device model and a corresponding software version.

10. The device of claim 9, further comprising a user history managing unit configured to manage a history of users that have accessed the server and used the services.

11. A service access control method for accessing an internet protocol server, the method comprising:

receiving, by a browser agent, device information and service information, the browser agent being embedded in a device;

controlling, by the browser agent, a connection between the internet protocol service server and the device based on the device information and the service information;

extracting client information from character strings according to a hypertext transfer protocol (HTTP) specification of the browser agent;

transmitting the extracted client information to the server; and verifying an identity of the device once based on a device serial number included in the browser agent when the device attempts to access the server using the browser agent so that the verifying the identity of the device is omitted when the device accesses the server again using the browser agent.

12. The method of claim 11, further comprising:

generating a session key when the device accesses the server using the browser agent; and transmitting the generated session key to the server.

13. The method of claim 12, wherein the generating comprises:

generating the session key once when the device accesses the server for a first time using the browser agent; and regenerating the session key when the device accesses the server again using the browser agent after a browser is terminated.

14. The method of claim 11, wherein the verifying comprises:

verifying the device information when the device attempts to access the server using the browser agent; and controlling the access of the device to the server.

15. The system of claim 14, further comprising providing a personalized service based on a combination of the device serial number included in the browser agent and user information.

16. The method of claim 11, further comprising updating the device information included in the browser agent.

17. The method of claim 11, further comprising managing services that can be supported by the server in a corresponding device model and a corresponding software version.

18. The method of claim 17, further comprising managing a history of users that have accessed the server and used the services.

* * * * *